No. 660,224. Patented Oct. 23, 1900.
J. W. SHINHOLSER.
INDICATOR ATTACHMENT FOR TYPE WRITING MACHINES.
(Application filed May 26, 1900.)
(No Model.)
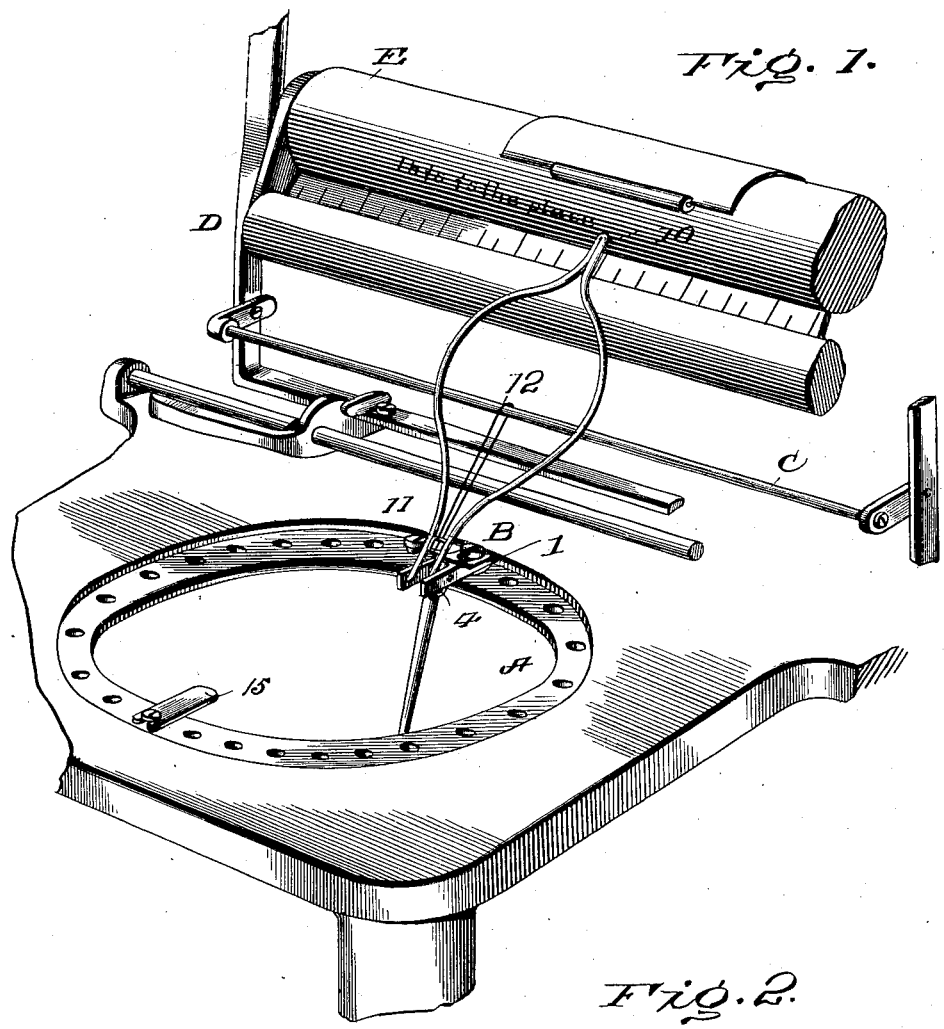
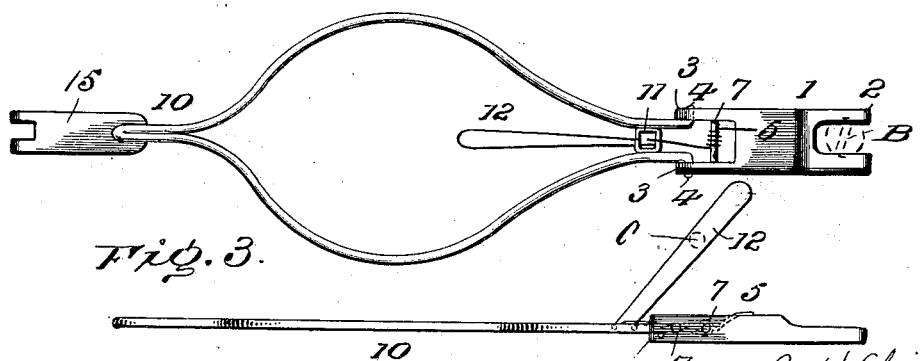
Witnesses:
Chas. K. Davies.
Inventor
J. W. Shinholser
By W. H. Bartlett
Attorney
THE NORRIS PETERS CO., PHOTO-LITHO., WASHINGTON, D. C.

UNITED STATES PATENT OFFICE.

JOHN W. SHINHOLSER, OF MACON, GEORGIA.

INDICATOR ATTACHMENT FOR TYPE-WRITING MACHINES.

SPECIFICATION forming part of Letters Patent No. 660,224, dated October 23, 1900.

Application filed May 26, 1900. Serial No. 18,092. (No model.)

*To all whom it may concern:*

Be it known that I, JOHN W. SHINHOLSER, a citizen of the United States, residing at Macon, in the county of Bibb and State of Georgia, have invented certain new and useful Improvements in Indicator Attachments for Type-Writing Machines, of which the following is a specification, reference being had therein to the accompanying drawings.

This invention relates to indicators for typewriting machines.

The object of the invention is to produce an indicator or pointer which shall follow the lifting-platen of a type-writer with a movement proportioned to the relative location of pointer and carriage so that the pointer shall reach the position to be indicated (usually the position of the last letter written or the next letter to be written) on or close to the paper as the carriage or platen reaches its extreme lifted position.

The invention consists in certain constructions and combinations of mechanisms, substantially as hereinafter stated.

Figure 1 is a broken perspective view of so much of a type-writing machine as is necessary to show the device in its operative relation. Fig. 2 is a plan of the parts constituting the indicator as prepared for attachment to a machine. Fig. 3 is a side elevation of the same.

The implement may be attached to the Manhattan, Remington, Caligraph, and other machines of the character in which the carriage swings upward to permit inspection of the writing. I have illustrated a modification specially adapted to the Manhattan machine, as the implement may be held to such machine by merely loosening the screw B, which holds the central type-bar support to the ring or basket A at the rear of the machine, and sliding the forked hanger under the screw-head.

The numeral 1 indicates the shelf or bracket to which the pointer 10 of my device is movably attached. The shelf 1 is a thin strip of metal, preferably having a fork 2 at the rear end, which fork may embrace the body and be held down by the head of screw B, as stated. The front end of bracket 1 forms a support in which the pointer 10 is hinged. By preference two arms 3 3 at the sides of the bracket receive the pivot or pintles 4 4 of the pointer, and when so connected the pointer may swing up or down on the pivots. A light spring 5 is connected to bracket 1, as by a spiral coiled around pin 7. One end of the spring bears on the bracket, the other bearing on the pointer 10 with a tendency to throw the pointer down to the position of Fig. 3. The pointer 10 is preferably in the form of a bow, as shown, and the material may be light wire, plate metal, or other suitable material. A cross-bar or filler-piece 11 serves as a bearing-piece for the end of spring 5 and also as a means for attachment of the lifting-piece 12. The lifting piece, link, or loop 12 is preferably a light wire forming a link, one end of which is attached to the pointer 10, as above stated, and the other end of the said link loosely embraces the rod C of the carriage D of the type-writer.

Most type-writer carriages of the genus referred to have a longitudinal rod in about the position of rod C. This rod moves with the carriage, and when the indicator is attached as stated the rod C moves freely lengthwise of the machine, and when the carriage is turned down the rod C may move back and forth without moving link 12 or even having contact therewith, as the link 12 will usually support itself. When the carriage is lifted, however, rod C draws on link 12, and the link 12 draws on the pointer 10 and turns it upward toward the position in full lines, Fig. 1. When the carriage is turned down, the spring 5 moves the pointer downward so quickly that it is always out of the way of the carriage.

The pointer 10 is preferably in the form of a bow or yoke, as shown, to permit the type characters to strike upwardly through its open center. When down, it rests upon or just above the ribbon and prevents the ribbon from rising when the type strike upward from below.

The pivot or pivots 4 have position somewhat forward from the rear side of the ring A of the machine. The pointer 10 is of such length as to reach from said pivots to the center of the roller-platen when said platen is in its elevated or turned-back position. The link 12 serves as a drawpiece or lifter to swing the pointer when the carriage is lifted. Hence the upward movement of the carriage to its extreme position lifts the pointer and turns it against or in close proximity to the paper, which is held on the platen, as usual, and the end of the pointer by its height indicates the place where the line will come in printing and by its lateral position indicates the position of the next letter in the line. So if it is desired to insert a word the roller-platen is lifted and turned until the position of the first letter of the word is opposite the end of the pointer 10, when the carriage is turned down and the printing proceeded with. Should link 12 break, the pointer may be lifted by hand.

The pointer 10 may be supported in its turned-down position by a shelf 15, which is a mere forked plate held by one of the screw-heads, or the pointer may be supported by a pin or extension 16 from bracket 1, or by both supports.

I have described the device as constructed for a particular machine; but with slight changes it may be adapted to other forms of machine. My claims are intended to cover, broadly, indicators of this class.

What I claim is—

1. An indicator for type-writing machines having a bracket secured to the frame, a hinged pointer connected to said bracket, a spring bearing on the pointer and tending to hold it down, and a loose connection from the pointer to the carriage by which the pointer is lifted as the carriage is lifted.

2. An indicator attachment for type-writing machines, having a forked bracket for attachment to a screw of the machine proper, a pointer hinged to said bracket and a spring for retaining said pointer in depressed position, an attachment to the frame by which said pointer is supported when depressed, and a link connecting the pointer to the carriage, in combination with the machine-frame and carriage, substantially as described.

3. An indicator for type-writers having a support which in operation is attached to the rear part of the frame, a pointer yieldingly connected to the support and normally projecting forward beyond the printing-center and passing around said center, and a link extending from said pointer and loosely embracing a longitudinal rod of the type-writer carriage, whereby the elevation of the carriage draws on the link and lifts the pointer, substantially as described.

4. In combination with the ring or basket of a type-writing machine, an indicator-pointer pivotally supported and connected to the rear portion of said basket, means connected to the carriage for lifting said pointer when the carriage is lifted, and means for holding the pointer down when the carriage is down, and a shelf at the front of the basket on which the pointer rests in its down position, whereby the pointer serves as a ribbon-guard, substantially as described.

5. In an indicator for type-writing machines, a forked bracket to embrace a screw-head on a type-basket, a pointer consisting of a bow having its rear ends pivoted in said bracket, a spring bearing on the bracket and on the pointer to press the pointer down as described, and a link connected to said pointer and having an opening through which the bar of the type-writer carriage may pass loosely, substantially as described.

In testimony whereof I affix my signature in presence of two witnesses.

JOHN W. SHINHOLSER.

Witnesses:
E. A. PAUL,
W. A. BARTLETT.